US008198857B2

(12) United States Patent
De Cremoux

(10) Patent No.: US 8,198,857 B2
(45) Date of Patent: Jun. 12, 2012

(54) COMMON-MODE VOLTAGE GENERATOR WITH A RIPPLE INSENSITIVE SENSOR FOR A BATTERY-SUPPLIED HANDSET APPARATUS

(75) Inventor: Guillaume De Cremoux, Edinburgh (GB)

(73) Assignee: NXP B.V., Eindhoven (NL)

( * ) Notice: Subject to any disclaimer, the term of this patent is extended or adjusted under 35 U.S.C. 154(b) by 876 days.

(21) Appl. No.: 11/632,613

(22) PCT Filed: Jul. 6, 2005

(86) PCT No.: PCT/IB2005/052252

§ 371 (c)(1),
(2), (4) Date: Feb. 20, 2009

(87) PCT Pub. No.: WO2006/008682

PCT Pub. Date: Jan. 26, 2006

(65) Prior Publication Data

US 2009/0167277 A1 Jul. 2, 2009

(30) Foreign Application Priority Data

Jul. 14, 2004 (EP) .................................... 04103373

(51) Int. Cl.
*H02J 7/00* (2006.01)

(52) U.S. Cl. ....................................... 320/107; 320/146

(58) Field of Classification Search .................. 320/107
See application file for complete search history.

(56) References Cited

U.S. PATENT DOCUMENTS

| | | | | |
|---|---|---|---|---|
| 6,304,088 | B1 * | 10/2001 | Yee | 324/433 |
| 6,426,670 | B1 * | 7/2002 | Tanaka | 327/541 |
| 2002/0140399 | A1 * | 10/2002 | Echarri et al. | 320/130 |

* cited by examiner

*Primary Examiner* — Arun Williams

(57) ABSTRACT

A common-mode voltage generator for a battery-supplied apparatus is provided with a battery voltage ripple-insensitive sensor comprising a voltage dividing circuit and a number of hysteresis comparators, by means of which a battery voltage, or a fraction thereof is compared with a series of reference voltages. These reference voltages are derived from an on-chip voltage by means of said voltage dividing circuit. The hysteresis of said hysteresis comparators is larger than the ripple on said battery voltage. Further there is an adjustable regulation loop. The sensor detects a battery voltage range and adjusts the regulation loop on the basis of this range. The regulation loop provides an output commonmode voltage, which is equal to a fraction, preferably half the battery voltage.

15 Claims, 3 Drawing Sheets

COMMON-MODE VOLTAGE GENERATOR WITH A RIPPLE INSENSITIVE SENSOR FOR A BATTERY-SUPPLIED HANDSET APPARATUS

The invention relates to a common-mode voltage generator for a battery-supplied apparatus, such as a mobile phone.

An apparatus, such as for instance a mobile phone, comprises an audio amplifier. Conventionally, the audio amplifier is supplied with power by a battery via an intermediate power supply or supply regulator, mostly realized in MOS components on a chip. Such a supply regulator has the disadvantage that it limits the swing in the output audio signal. A known way to circumvent this problem is to supply the audio amplifier directly with power by the battery. Handset batteries could afford high voltages, like 5.4 V, thus enabling a larger swing of the output audio signal. Further, the removal of the supply regulator has the advantage that space on the chip may be saved.

This solution induces several problems. For instance the amplifier must reject all the noise and disturbance of the battery, while in the original solution the supply regulator handles part of this rejection. Furthermore, the inverting and non-inverting input voltages of the amplifier usually refer to an internal common-mode voltage $V_{COMin}$ while the output common-mode voltage $V_{COMout}$ is preferably the middle between the battery voltage and ground. Also the generation of the output common-mode voltage must be realized.

Regarding the latter problem, the output common-mode voltage $V_{COMout}$ is preferably chosen to be half the battery voltage $V_{BAT}$, because this will allow a maximum swing around $V_{COMout}$, from 0 to $V_{BAT}$, a problem that the voltage generated by the battery may have. For instance, for mobile phone handsets it is well known that there is a disturbance voltage at a fundamental frequency of 217 Hz. If a conventional single voltage divider, a resistor ladder, is used to obtain $\frac{1}{2}*V_{BAT}$, this ripple will be transmitted and remains an important source of output signal disturbance, even if divided by two. The magnitude of the ripple is about 0.4 V, corresponding with about −20 dB compared to the audio signals. This is usually not acceptable in audio applications.

Therefore the spurious frequency must be reduced. For instance for handsets a reduction up to 80 dB may be required, because any disturbance on $V_{COMout}$ is transmitted to the output voltage and is audible. It is known that if a bridge-tied load (loudspeaker) is applied, a fluctuation of $V_{COMout}$ has somewhat less influence than in the case of a single ended load, because both output voltages between which the load is brought will have the same $V_{COMout}$, and the difference between the two output voltages virtually eliminates $V_{COMout}$ by subtraction; this is the well-known common-mode rejection (CMRR). In practice, CMRR has a limited effect: only about 20 dB attenuation. So, with a ripple of −20 dB and with a bridge-tied load, $V_{COMout}=\frac{1}{2}*V_{BAT}$ still needs 40 dB attenuation. In another known method a filtering capacitor is applied. This is equivalent to a first-order filtering. However, this approach requires a large resistance and a large capacitance. Such components are usually not realizable as integrated circuit components because they take up too much chip area. Further, the initial charging time of a capacitor having a large capacitance is long and the start-up time of the amplifier is increased as a result.

The purpose of the invention is to obtain a common-mode voltage generator for a battery-supplied apparatus without requiring a capacitor to realize an attenuation.

To this end the common-mode voltage generator according to the invention is characterized by the characterizing portion of claim 1.

All circuits in the common-mode voltage generator may be used with small MOS components. By applying the measure according to the invention, a capacitor is not required and in case the common-mode voltage regulator is realized as an integrated circuit device chip space may be saved.

The invention relates to the generation of the common-mode voltage, usually the value $\frac{1}{2}*V_{BAT}$ in a way that any ripple or fluctuation on $V_{BAT}$ does not appear in $\frac{1}{2}*V_{BAT}$. In US patent specification 2003/0194081 a battery voltage filtering circuit is disclosed, which is only applicable in a bridge-tied load configuration. In single-ended configurations the ripple on $V_{BAT}$ is partially transmitted. The reference voltage in this bridge-tied load configuration is the common-mode voltage itself, whose generation is not disclosed in said patent specification.

In U.S. Pat. No. 6,603,354 a supply common-mode voltage $\frac{1}{2}*V_{DD}$ is derived from $V_{DD}$, however, in such a way that variations in $V_{DD}$ will appear in the common-mode voltage. Therefore, this circuit is not applicable in a battery-supplied apparatus in which a ripple is present on the battery voltage.

The invention further relates to a battery-supplied apparatus provided with a common-mode voltage generator as described above.

The above and other objects and features of the present invention will become more apparent from the following detailed description considered in connection with the accompanying drawings, in which.

All the embodiments are realized here with MOS components on a chip.

Figure 1:
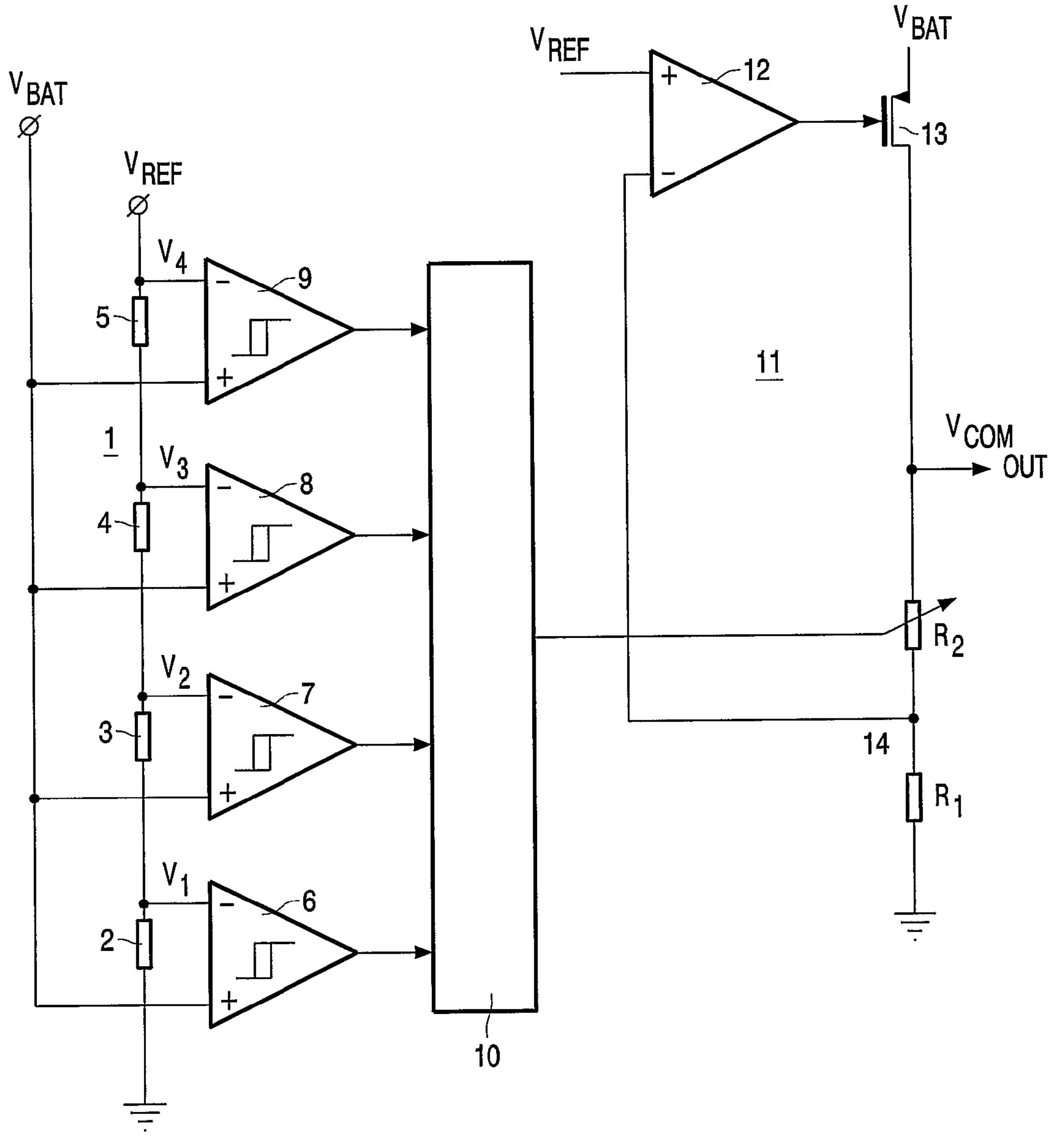
FIG. 1 shows the principle of a common-mode voltage generator according to the invention.

The common-mode voltage generator of FIG. 1 comprises a battery voltage sensor having a resistor ladder 1 with four resistors 2-5 between a reference voltage $V_{REF}$ and a voltage level 0, and four hysteresis comparators 6-9. The voltages V1, V2, V3 and V4=$V_{REF}$, respectively, from the resistor-ladder 1 are supplied to the inverting input of these comparators. $V_{REF}$ is an internal on-chip voltage. An external battery voltage $V_{BAT}$ is supplied to the non-inverting input of these comparators. In a mobile phone, for example, the battery has a well-known disturbing voltage varying at a minimal frequency of 217 Hz. With a full battery voltage of about 4V this disturbing voltage is about 0.4 V peak-to-peak, corresponding with a ripple of about −20 dB. The hysteresis voltage value of the comparators 6-9 is chosen slightly greater than the 217 Hz-ripple. By this measure it is ensured that if $V_{BAT}$ varies as a consequence of the 217 Hz-ripple, the respective comparator will not modify its output. Therefore, the battery voltage sensor is not sensitive to the ripple on the battery.

The common-mode voltage generator further comprises a digital interface 10 and an active regulation loop 11, consisting of an operational amplifier 12, a linearly operating transistor 13, and a resistor-ladder 14, having a fixed resistor R1 and an adjustable resistor R2. The voltage value over R1 is supplied to the inverting input of the amplifier 12, while the voltage value $V_{REF}$ is supplied to the non-inverting input. The voltage over the transistor 13 and the resistor-ladder 14 can be any internal on-chip voltage value and, as indicated in FIG. 1, even the battery voltage itself. The transfer function of this regulation loop can be represented by the following relation:

$$V_{COMout}=(1+R2/R1)*V_{REF}.$$

The resistor R2 is controlled by the output signals of the comparators 6-9 via the digital interface 10 in such a way that for each $V_{BAT}$-interval an appropriate value of R2 is determined, resulting in the regulation loop in a $V_{COMout}$ value, corresponding with the value that is closest to half the momentary value of $V_{BAT}$. Any variation of $V_{COMout}$ of the expected value is sensed by the ladder R1, R2 and compared with the reference voltage $V_{REF}$. The amplifier 12 tunes the gate of the transistor 13 to regulate and maintain $V_{COMout}$ back to the desired value.

In a more practical embodiment first a voltage $1/4*V_{BAT}$ is derived from the voltage $V_{BAT}$ by means of a resistor network. Instead of the value $V_{BAT}$ the value $1/4*V_{BAT}$ is supplied to the non-inverting inputs of the hysteresis comparators. The reason for this is that $V_{BAT}$ can reach a value of about 5.4 V, that is, beyond the maximum rating of the MOS components used for the hysteresis comparators. Also $1/4*V_{BAT}$ becomes comparable to the reference voltage $V_{REF}$=1.25 V, that is an available internal reference voltage on the chip.

Figure 2:
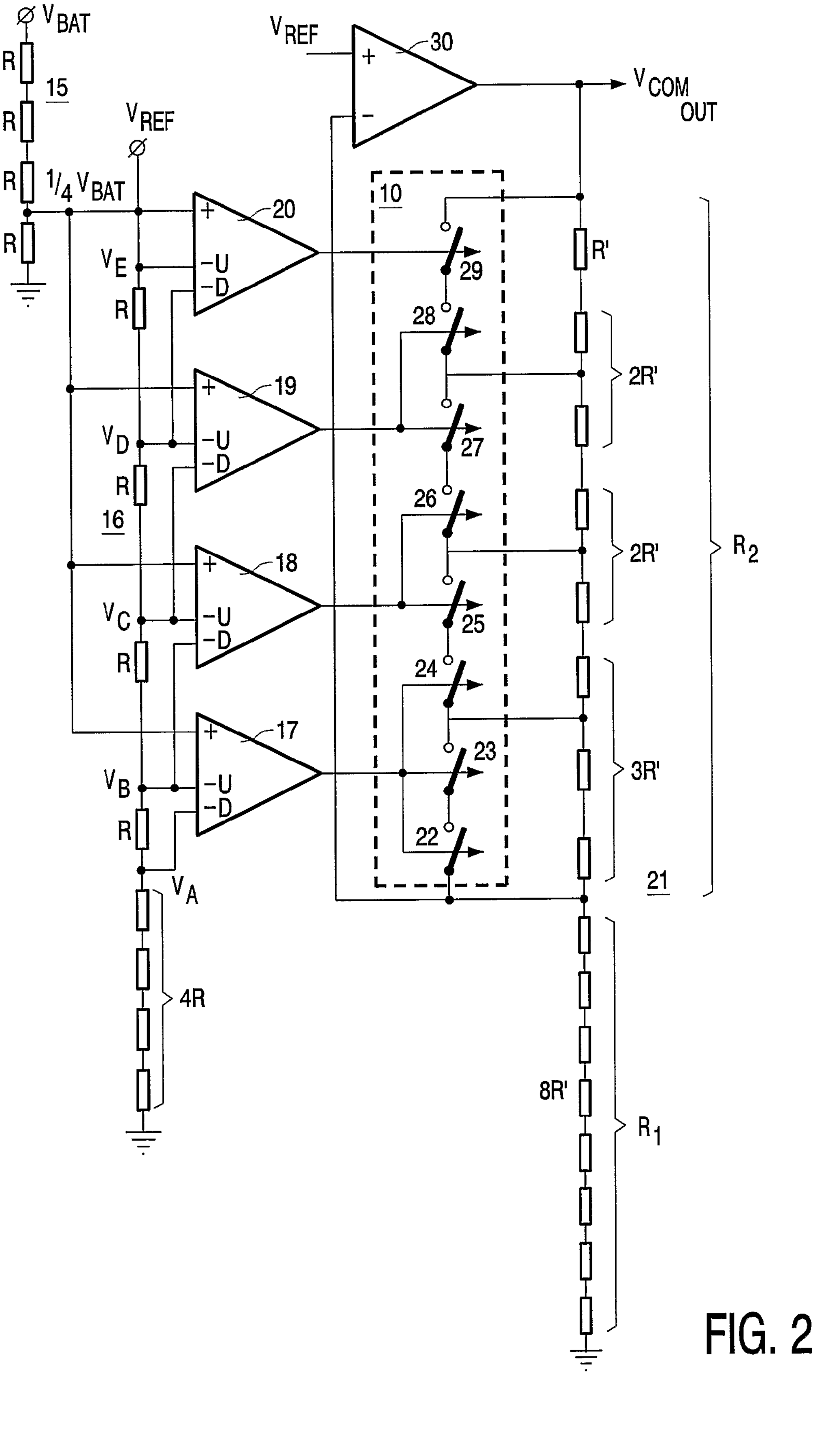
FIG. 2 shows in more detail a first embodiment of a common-mode voltage generator according to the invention.

Such an embodiment is depicted in FIG. 2. The voltage $1/4*V_{BAT}$ is derived from the value $V_{BAT}$ by means of a first resistor ladder 15. Voltage values of, for example, $V_A$=0.62 V, $V_B$=0.78 V, $V_C$=0.94 V, $V_D$=1.09 V are obtained by means of a second resistor ladder 16, with a reference voltage $V_{REF}$=1.25 V, while $V_E$=1.25 V. In this embodiment the separate resistors in both ladders 15 and 16 have all the same value R. The voltage value $1/4*V_{BAT}$ is supplied to the non-inverting input of the hysteresis comparators 17-20, while the voltage values $V_A$ tot $V_D$ are supplied to the down-inverting inputs of these comparators and the voltages $V_B$ to $V_E$ to the up-inverting inputs of these comparators, with the result that:

- if $1/4*V_{BAT}$>1.25 V, then the digital output voltages of the successive hysteresis comparators 23-20 are 1111;
- if 1.09 V<$1/4*V_{BAT}$<1.25 V, then these digital comparator output voltages are 0111;
- if 0.94 V<$1/4*V_{BAT}$<1.09 V, then the digital comparator output voltages are 0011;
- if 0.78 V<$1/4*V_{BAT}$<0.94 V, then the digital comparator output voltages are 0001;
- if 0.62 V<$1/4*V_{BAT}$<0.78 V, then the digital comparator output voltages are 0000.

The values in the range from 0 to 0.62 V are ignored, because $V_{BAT}$ is only usable in practice when greater than 2.5 V.

The hysteresis effect of the comparators is achieved by the fact that if the comparator output is low, then the up-inverting input is selected as the inverting input, and if the comparator output is high, then the down-inverting input is selected as the inverting input.

The output values of the hysteresis comparators control the adjustable part R2 of the resistor ladder 21; the fixed part is indicated by R1. Both R1 and R2 are formed by equal resistance values R'. R1=8R', while R2 may vary between 0 and 8R'. The adjustable part is controlled by the comparator output voltages via switches 22-29, which are part of the digital interface 10. In practice the switches 22-29 are formed by switch transistors. Further the regulation loop in this embodiment is equal to that of FIG. 1; so, the voltage over RI is supplied to the inverting input of the amplifier 30, while the reference value $V_{REF}$=1.25 V is supplied to the non-inverting input of amplifier 33. The switch transistor 13 in FIG. 1 is integrated in the amplifier 30. Taking into account the above transfer function for $V_{COMout}$, it is found that:

- if $V_{BAT}$>5 V and thus if $1/4*V_{BAT}$>1.25 V, all the switches 22-29 are opened, so that R2=8R' and $V_{COMout}$=2.5 V;
- if 4.4 V<$V_{BAT}$<5 V and thus if 1.09 V<$1/4*V_{BAT}$<1.25 V, the switches 22-28 are opened, so that R2=7R' and $V_{COMout}$=2.3 V;
- if 3.7 V<$V_{BAT}$<4.4 V and thus if 0.94 V<$1/4*V_{BAT}$<1.09 V, the switches 22-26 are opened, so that R2=5R' and $V_{COMout}$=2.05 V;
- if 3.1 V<$V_{BAT}$<3.7 V and thus if 0.78 V<$1/4*V_{BAT}$<0.94 V, only the switches 22-24 are opened, so that R2=3R' and $V_{COMout}$=1.7 V;
- if 2.5 V<$V_{BAT}$<3.1 V and thus if 0.62 V<$1/4*V_{BAT}$<0.78 V, all switches remain closed, so that R2=0 and $V_{COMout}$=1.25 V.

From the above it will be clear that stable values of $V_{COMout}$ are obtained, corresponding with half the momentary value of $V_{BAT}$, but without the ripple in $V_{BAT}$ and without the use of capacitors that take up a large surface on the chips.

Figure 3:
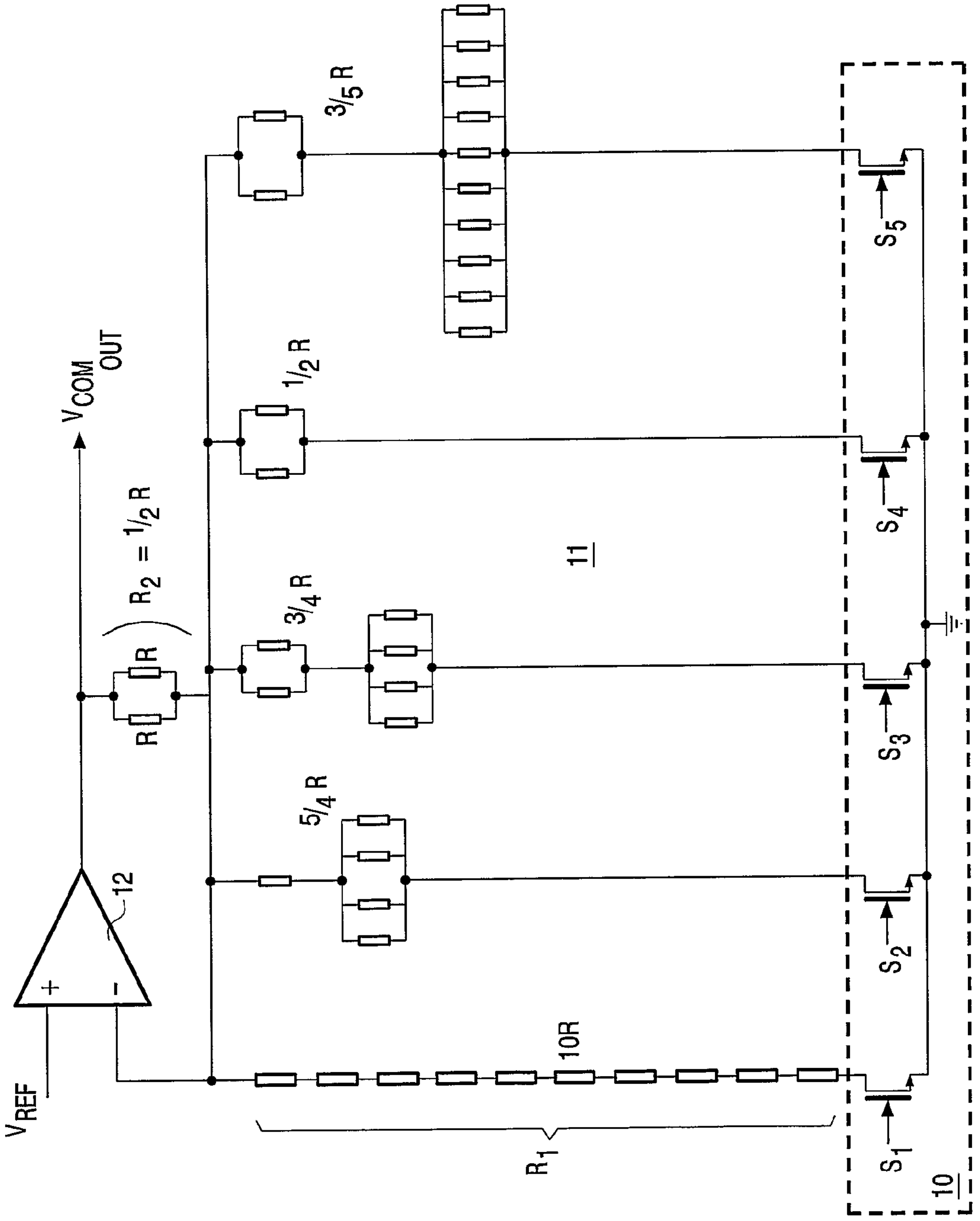
FIG. 3 shows in more detail a second embodiment of the regulation part of a common-mode voltage generator according to the invention.

Instead of R2 being an adjustable resistor and R1 a fixed resistor, it is also possible for R1 to be chosen adjustable and R2 fixed. This situation is indicated in FIG. 3. Further a parallel configuration of resistors is given. FIG. 3 only shows the regulating part of the common-mode voltage generator; the first part thereof is the same as in FIG. 2; this means that the control signals S1-S5 are derived again from the hysteresis comparators via the digital interface 10. The resistances R1 and R2 are formed by combinations of resistors all having the same area on the chip. So, the fixed resistor R2 has the value 0.5 R, while the adjustable resistor R1 can have the values 10 R, 1.25 R, 0.75 R, 0.5 R and 0.6 R. By means of the above transfer function and the reference voltage value $V_{REF}$=1.25 V, the following values for $V_{COMout}$ are obtained: 1.31 V, 1.75 V, 2.08 V, 2.30 V and 2.50 V, practically corresponding with the values obtained by means of the embodiment of FIG. 2.

In practice the total area needed for realizing the common-mode output voltage generator according to the invention is comparable to that of a single capacitor of 100 pF, but achieves a rejection efficiency, i.e. a ripple attenuation, that could be obtained with a filter with R=800 MegOhm and C=1 nF, in which case, compared to the common-mode voltage generator according to the invention, 100 times more space would be needed to match the performance.

The examples described herein are intended to be taken in an illustrative and not limiting sense. Various modifications may be made to the described embodiments by persons skilled in the art without departing from the scope of the present invention as defined in the appended claims. It may particularly be noted that a refinement of the $V_{BAT}$ sensing can be performed by increasing the number of hysteresis comparators.

In summary the invention relates to a common-mode voltage generator for a battery-supplied apparatus provided with a battery voltage ripple-insensitive sensor. The battery-supplied apparatus comprises a voltage dividing circuit and a number of hysteresis comparators. b A battery voltage, or a fraction thereof, is compared with a series of reference voltages means of the comparators. These reference voltages are derived from a reference voltage by means of said voltage dividing circuit. The hysteresis of said hysteresis comparators is larger than the ripple on said battery voltage. Further there is an adjustable regulation loop. The sensor detects a battery voltage range and adjusts the regulation loop on the basis of this range. The regulation loop provides for an output common-mode voltage, which is equal to a fraction of, preferably half the battery voltage.

Preferably the common-mode voltage generator is realized as an integrated circuit device. The reference voltage is preferably generated by an on-chip reference voltage generator which is part of the integrated circuit device.

The invention claimed is:

1. A common-mode voltage generator for a battery-supplied apparatus, comprising:

a battery voltage sensor and an adjustable regulation loop, the battery voltage sensor having a voltage dividing circuit and a number of hysteresis comparators, by means of which comparators a battery voltage, or a fraction thereof is compared with a series of reference voltages, derived from a reference voltage by means of said voltage dividing circuit, said hysteresis comparators having a hysteresis being greater than the ripple on said battery voltage, said sensor being arranged for detecting a battery voltage range and adjusting the regulation loop on the basis of this range, which regulation loop is arranged for providing an output common-mode voltage, which is equal to a fraction of the battery voltage.

2. A The common-mode voltage generator in of claim 1, wherein the output common-mode voltage is substantially half the battery voltage.

3. A The common-mode voltage generator of claim 1, characterized in that-the regulation loop comprises a resistor ladder with a fixed resistor and an adjustable resistor, and has a transfer function represented by:

$V_{COMout}=(1+R2/R1)*V_{REF}$, with $V_{COMout}$ the output common-mode voltage, R1 and R2 the resistance values and $V_{REF}$ an internal on-chip voltage.

4. The common-mode voltage generator of claim 3, characterized in that a digital interface between the voltage sensor and the regulation loop, the digital interface allowing the hysteresis comparator output values to control a series of switching elements, and in that the adjustable resistor ladder has a number of separate resistors, which are switched in or out of the regulation loop by the switching elements.

5. An integrated circuit device comprising a common-mode voltage generator as claimed in claim 1.

6. The integrated circuit device as claimed in claim 5, further comprising a reference voltage generator for generating the reference voltage.

7. A battery-supplied apparatus provided with the common-mode voltage generator as claimed in claim 1.

8. A method for generating a common-mode voltage for a battery-supplied apparatus by means of a common-mode voltage generator comprising a battery voltage sensor and an adjustable regulation loop, said battery voltage sensor having a voltage dividing circuit and a number of hysteresis comparators comparing a battery voltage, or a fraction thereof with a series of reference voltages derived from a reference voltage by means of said voltage dividing circuit, said hysteresis comparators having a hysteresis being greater than the ripple on said battery voltage, said sensor detecting a battery voltage range and adjusting the regulation loop on the basis of this range, said regulation loop providing an output common-mode voltage, which is equal to a fraction of the battery voltage.

9. The method of claim 8, wherein the output common-mode voltage is substantially half the battery voltage.

10. The method of claim 8, wherein the regulation loop further comprises a resistor ladder with a fixed resistor and an adjustable resistor, and has a transfer function represented by: $V_{COMout}=(1+R2/R1)*V_{REF}$, with $V_{COMout}$ the output common-mode voltage, R1 and R2 the resistance values and $V_{REF}$ an internal on-chip voltage.

11. The method of claim 10, further comprising a digital interface between the voltage sensor and the regulation loop, the digital interface allowing the hysteresis comparator output values to control a series of switching elements, and in that the adjustable resistor ladder has a number of separate resistors, which are switched in or out of the regulation loop by the switching elements.

12. The common-mode voltage generator of claim 1, wherein the regulation loop further comprises a resistor ladder having a fixed resistor and an adjustable resistor.

13. The method of claim 8, wherein the regulation loop further comprises a resistor ladder having a fixed resistor and an adjustable resistor.

14. The common-mode voltage generator of claim 1, wherein the adjustable regulation loop is controlled via output values of the hysteresis comparators.

15. The method of claim 8, wherein the adjustable regulation loop is controlled via output values of the hysteresis comparators.

* * * * *